United States Patent [19]
Zakula

[11] Patent Number: 5,564,740
[45] Date of Patent: Oct. 15, 1996

[54] AIR BAG INFLATOR

[75] Inventor: Mitchell P. Zakula, Tempe, Ariz.

[73] Assignee: TRW Inc., Lyndhurst, Ohio

[21] Appl. No.: 401,345

[22] Filed: Mar. 9, 1995

[51] Int. Cl.[6] .................................................. B60R 21/26
[52] U.S. Cl. ............................................. 280/737; 222/5
[58] Field of Search .................................... 280/736, 737, 280/741, 742; 222/5; 137/68.1; 220/89.1, 89.2, 89.3

[56] References Cited

U.S. PATENT DOCUMENTS

| | | | |
|---|---|---|---|
| 3,690,695 | 9/1972 | Jones | 222/5 |
| 3,744,816 | 7/1973 | Yamaguchi et al. | |
| 4,482,081 | 11/1984 | Meggs | 222/5 |
| 5,076,312 | 12/1991 | Powell | 137/68.1 |
| 5,242,194 | 9/1993 | Popek | 280/737 |
| 5,345,876 | 9/1994 | Rose et al. | 102/531 |

Primary Examiner—Paul N. Dickson
Attorney, Agent, or Firm—Tarolli, Sundheim, Covell, Tummino & Szabo

[57] ABSTRACT

An inflator (10) includes a striker (20) movable into engagement with a burst disk (16) to rupture the burst disk and allow stored gas to flow from a container (14) through passage means (60–64) into an air bag (not shown). A piston (30) connected for movement with the striker (20) is disposed in a cylinder (80). An initiator (32), upon actuation, moves the piston (30) in the cylinder (80) to move the striker (20) into engagement with the burst disk (16). An end portion (154) of the striker (20) removes a portion (142) of the burst disk (16) which includes an area of intersection of score lines (132–138) on the burst disk. Combustion products of the initiator (32) flow into the cylinder (80). The combustion products flow through openings (180, 152) around the piston (30) and around the striker (20) into the passage means (60–64) prior to and after rupturing of the burst disk (16).

13 Claims, 4 Drawing Sheets

AIR BAG INFLATOR

BACKGROUND OF THE INVENTION

1. Technical Field

The present invention relates to an apparatus for inflating an inflatable vehicle occupant restraint, and particularly relates to an inflator for inflating an air bag in the event of a side impact to a vehicle.

2. Description of the Prior Art

It is known to inflate an air bag to protect a vehicle occupant in the event of a side impact to a vehicle. The air bag is stored in a deflated condition, together with an inflator, in or adjacent to the vehicle seat in which the occupant is seated. In the event of a side impact to the vehicle, the inflator is actuated and the air bag is inflated into a position between the vehicle occupant and the adjacent vehicle door. The air bag can protect the vehicle occupant from forcefully striking or being struck by parts of the vehicle such as the door. The air bag can also protect the vehicle occupant from objects which might intrude through the door or window of the vehicle during the side impact.

An inflator for a side impact air bag commonly includes a container in which a quantity of gas is stored under pressure. A rupturable burst disk closes the container. Upon actuation of the inflator, an electrically actuated initiator causes a striker to move into engagement with the burst disk. The burst disk is ruptured to enable gas to flow from the container to the air bag.

SUMMARY OF THE INVENTION

The present invention is an apparatus for inflating an inflatable vehicle occupant restraint to protect a vehicle occupant in the event of a side impact to the vehicle. The apparatus comprises a container for storing fluid under pressure. A manifold connected with the container includes passage means for directing a flow of fluid from the container into the inflatable vehicle occupant restraint. The manifold has a side wall and an end wall defining a cylinder in the manifold. A burst disk is located to block fluid flow from the container through the passage means. A piston is disposed in the cylinder and divides the cylinder into a first portion and a second portion. The piston has an outer peripheral portion disposed adjacent to and spaced apart from the side wall of the cylinder. A striker connected for movement with the piston extends axially from the piston through the second portion of the cylinder in a direction toward the burst disk. The piston and the striker are movable axially in the cylinder from a first position in which the striker is spaced apart from the burst disk to a second position in which the striker is in engagement with the burst disk to cause rupturing of the burst disk. The end wall of the manifold defines an opening extending between the second portion of the cylinder and the passage means. The striker extends out of the second portion of the cylinder through the opening in the end wall and into the passage means. The striker has an outer peripheral portion which is disposed adjacent to and spaced apart from the end wall. An initiator, upon actuation, moves the piston in the cylinder from the first position to the second position. The initiator produces combustion products which flow, upon actuation of the initiator and when the piston is in the first position, from the first portion of the cylinder, between the outer peripheral portion of the piston and the side wall of the cylinder, into the second portion of the cylinder. The combustion products of the initiator flow from the second portion of the cylinder, through the opening in the end wall of the cylinder and into the passage means, when the piston is in the first position.

In one embodiment of the invention, the piston is supported for movement in a direction along a central axis of the burst disk. Spring means biases the piston into the first position. The piston moves against the biasing effect of the spring means from the first position to the second position to cause rupturing of the burst disk. The burst disk has a plurality of score lines which intersect each other. An area of the burst disk includes a portion of each one of the score lines and the intersection of the score lines. The piston has a portion for cutting the area out of the burst disk upon movement of the piston from the first position to the second position.

BRIEF DESCRIPTION OF THE DRAWINGS

The foregoing and other objects and features of the present invention will become more apparent to one skilled in the art upon a consideration of the following description of the invention and the accompanying drawings, in which.

DESCRIPTION OF PREFERRED EMBODIMENT

Figure 1:
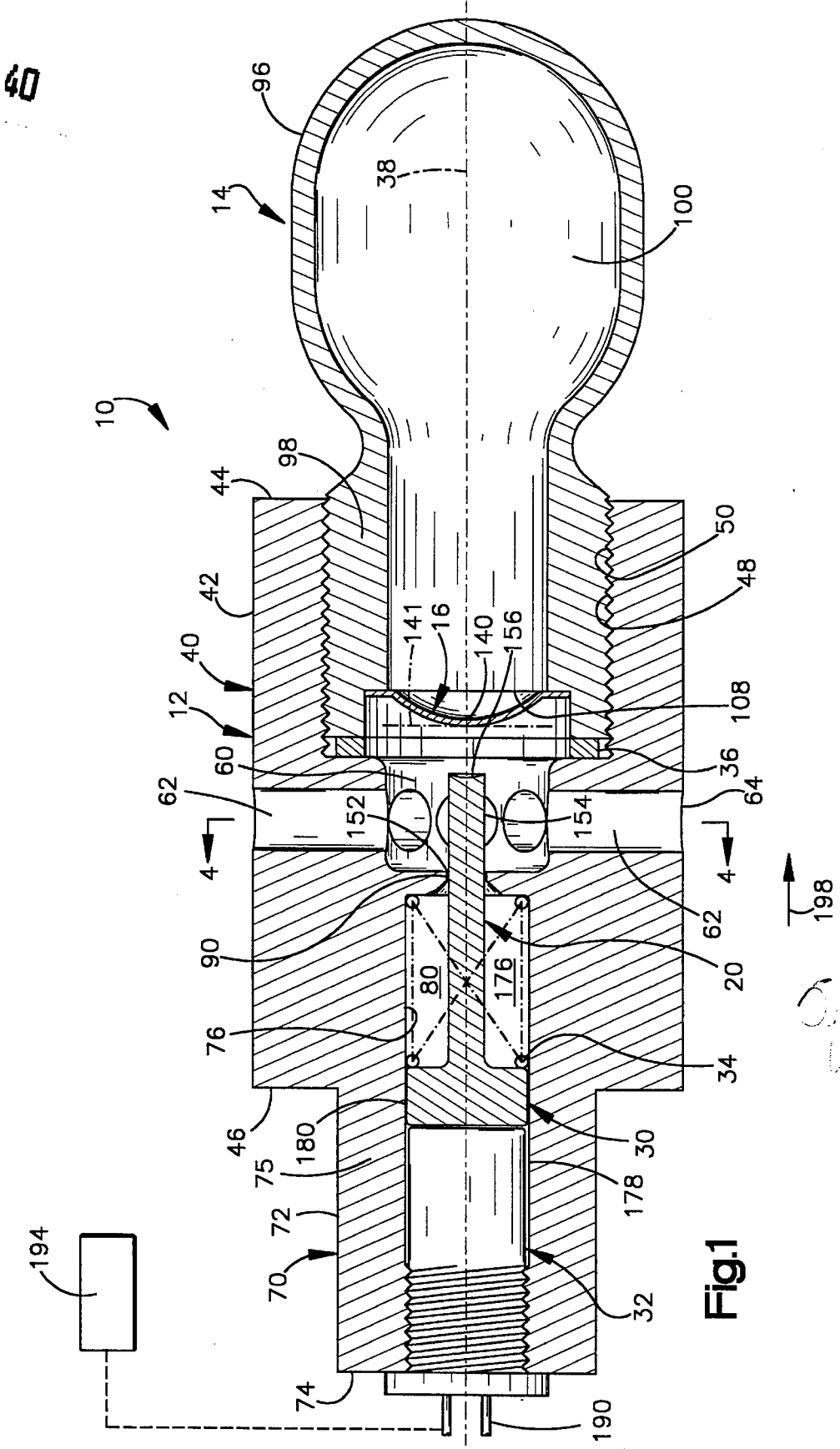
FIG. 1 is a longitudinal sectional view of an air bag inflator constructed in accordance with the present invention shown in a condition prior to actuation.

The present invention relates to an apparatus for inflating an inflatable vehicle occupant restraint and particularly relates to an inflator for inflating an air bag in the event of a side impact to a vehicle. The present invention is applicable to various inflator constructions. As representative of the present invention, FIG. 1 illustrates an air bag inflator 10.

The inflator 10 includes a manifold 12, a gas storage container 14 connected with the manifold, and a burst disk 16 for closing the container. The inflator 10 also includes a striker 20 for rupturing the burst disk 16. The striker 20 is formed as one piece with a piston 30 which is supported for movement in the manifold 12 relative to the burst disk 16. The inflator 10 further includes a spring 34, a seal 36, and an initiator 32 for causing movement of the piston 30 and the striker 20.

The manifold 12 (FIGS. 1 and 2) is a generally cylindrical metal member which extends around a longitudinal central axis 38 of the inflator 10. A main body portion 40 of the manifold 12 has a cylindrical outer surface 42 which extends axially between opposite radially extending end surfaces 44 and 46. A threaded cylindrical inner surface 48 of the main body portion 40 of the manifold 12 defines a bore 50 which extends axially inward from the end surface 44. An annular inner end surface 52 (FIG. 2) on the manifold 12 extends radially inward from the cylindrical surface 48 at the axially inner end of the bore 50.

Another cylindrical surface 54 on the manifold 12 extends axially from the surface 52 in a direction toward the end surface 46. The cylindrical surface 54 together with a radially extending surface 56 defines a distribution chamber 60 in the manifold 12. The distribution chamber 60 forms a part of passage means in the manifold 12 for directing a flow of gas from the container 14 into the air bag (not shown). The passage means also includes eight cylindrical gas outlet passages 62 disposed in a circular array around the distribution chamber 60. The gas outlet passages 62 extend radially between the distribution chamber 60 and the outer surface 42 of the main body portion 40 of the manifold 12. Each gas outlet passage 62 terminates in a respective gas outlet opening 64 formed in the outer surface 42 of the main body portion 40 of the manifold 12. The inflator 10 may also include a diffuser (not shown) for directing gas from the gas outlet openings 64 into the air bag (not shown).

An initiator portion 70 (FIGS. 1 and 2) of the manifold 12 extends axially from the main body portion 40. A cylindrical outer surface 72 of the initiator portion 70 extends axially between the radially extending end surface 46 of the main body portion 40 and a radially extending end surface 74 of the initiator portion of the manifold. The initiator portion 70 and the main body portion 40 of the manifold 12 together form a cylindrical side wall 75 of the manifold. The side wall 75 has an axially extending cylindrical inner surface 76 (FIG. 2) which defines a cylinder 80 in the manifold 12. The cylinder 80 has a longitudinal central axis which is coincident with the axis 38.

The cylinder 80 extends axially between the end surface 74 (FIG. 1) and an annular radially extending end wall 82 (FIG. 2) of the manifold 12. The radially extending surface 56 which partially defines the distribution chamber 60 is located on one side of the end wall 82. A radially extending surface 84 on the opposite side of the end wall 82 extends parallel to the surface 56. A frustoconical surface 86 on the end wall 82 extends radially inward from the surface 84 and merges with an annular axially extending cylindrical surface 88. The surface 88 defines a cylindrical passage or opening 90 which extends axially between the cylinder 80 and the distribution chamber 60. The opening 90 has a circular cross-sectional configuration.

The gas storage container 14 (FIG. 1) is preferably made of metal and defines a gas storage chamber 100 which is filled with gas under pressure introduced into the chamber through a fill port (not shown). The gas which is stored in the chamber 100 is preferably helium at a pressure of approximately 4,500 psi. The container 14 could be used, however, to store other gases at different pressures. For example, the container 14 could be used to store air or nitrogen or argon.

A mounting portion 98 of the container 14 has an external thread convolution and is screwed into the bore 50 in the main body portion 40 of the manifold 12. The seal 36 seals between an annular inner end surface 102 (FIG. 2) of the container 14 and the radially extending inner end surface 52 on the manifold 12. An axially extending cylindrical surface 104 (FIG. 2) and a radially extending annular surface 106 define a shoulder 107 in the mounting portion 98 of the container 14 spaced axially from the end surface 102. A passage or opening 108 in the container 14, radially inward of the shoulder 107, enables fluid communication between the chamber 100 and the distribution chamber 60.

The burst disk 16 is disposed on the shoulder 107 in the mounting portion 98 of the container 14. The burst disk 16 blocks a flow of gas from the container 14 until the burst disk is ruptured. The burst disk 16 extends generally perpendicular to the axis 38 of the inflator 10 and has a central axis which is coincident with the axis 38.

Figure 5:
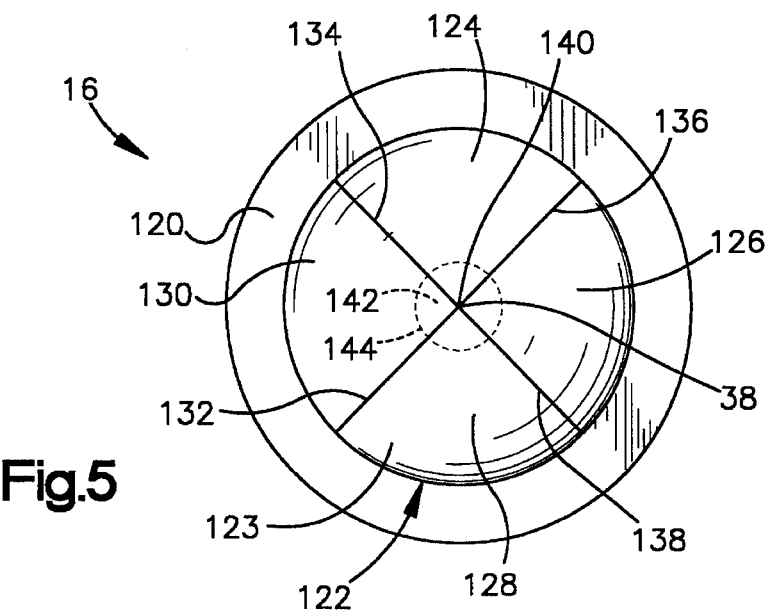
FIG. 5 is an elevational view of a burst disk of the inflator of FIG. 1.

An annular radially extending mounting portion 120 (FIGS. 2 and 5) of the burst disk 16 is secured to the surface 106 of the container 14 in a known manner such as by welding. A circular domed or bulged central portion 122 of the burst disk 16 extends across the passage 108 at the axially inner end of the container 14. The central portion 122 of the burst disk 16 has a convex outer surface 123 which is presented toward the striker 20.

The central portion 122 of the burst disk 16 (FIG. 5) is divided into four equal segments 124, 126, 128 and 130 by four intersecting score lines 132, 134, 136 and 138. The score lines 132–138 intersect at and extend radially outward from the center 140 of the burst disk 16, located on the axis 38. The burst disk 16 is configured such that a reference plane 141 extending tangent to the convex outer surface 123 of the burst disk 16, at the point 140, extends perpendicular to the axis 38. A circular area 142 of the burst disk 16, as indicated by the dashed circle 144 in FIG. 5 centered on the axis 38, includes the intersection of the score lines 132–138 as well as a portion of each one of the score lines.

Figure 2:
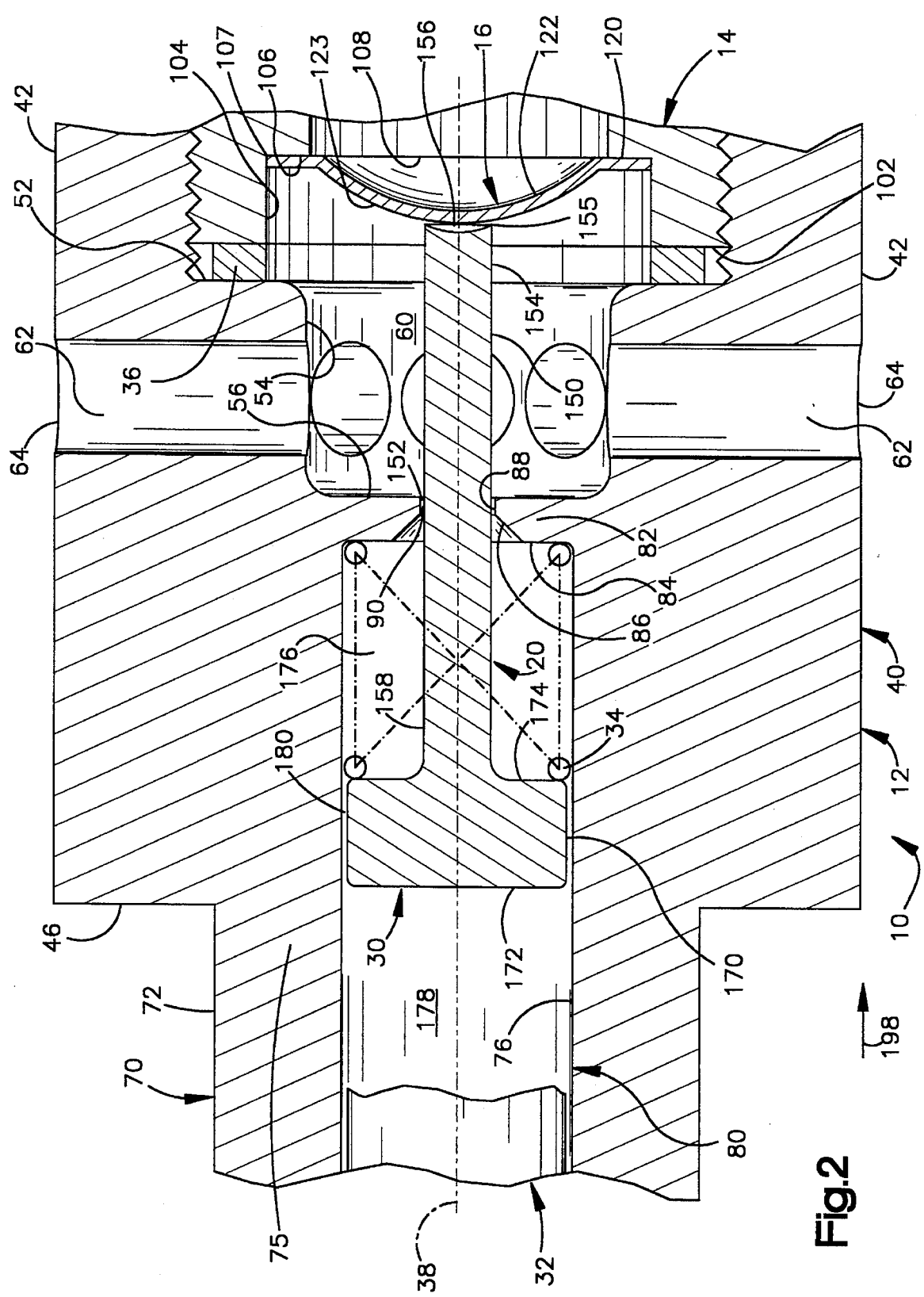
FIG. 2 is an enlarged view of a portion of the inflator of FIG. 1 shown in a first stage of actuation.
Figure 4:
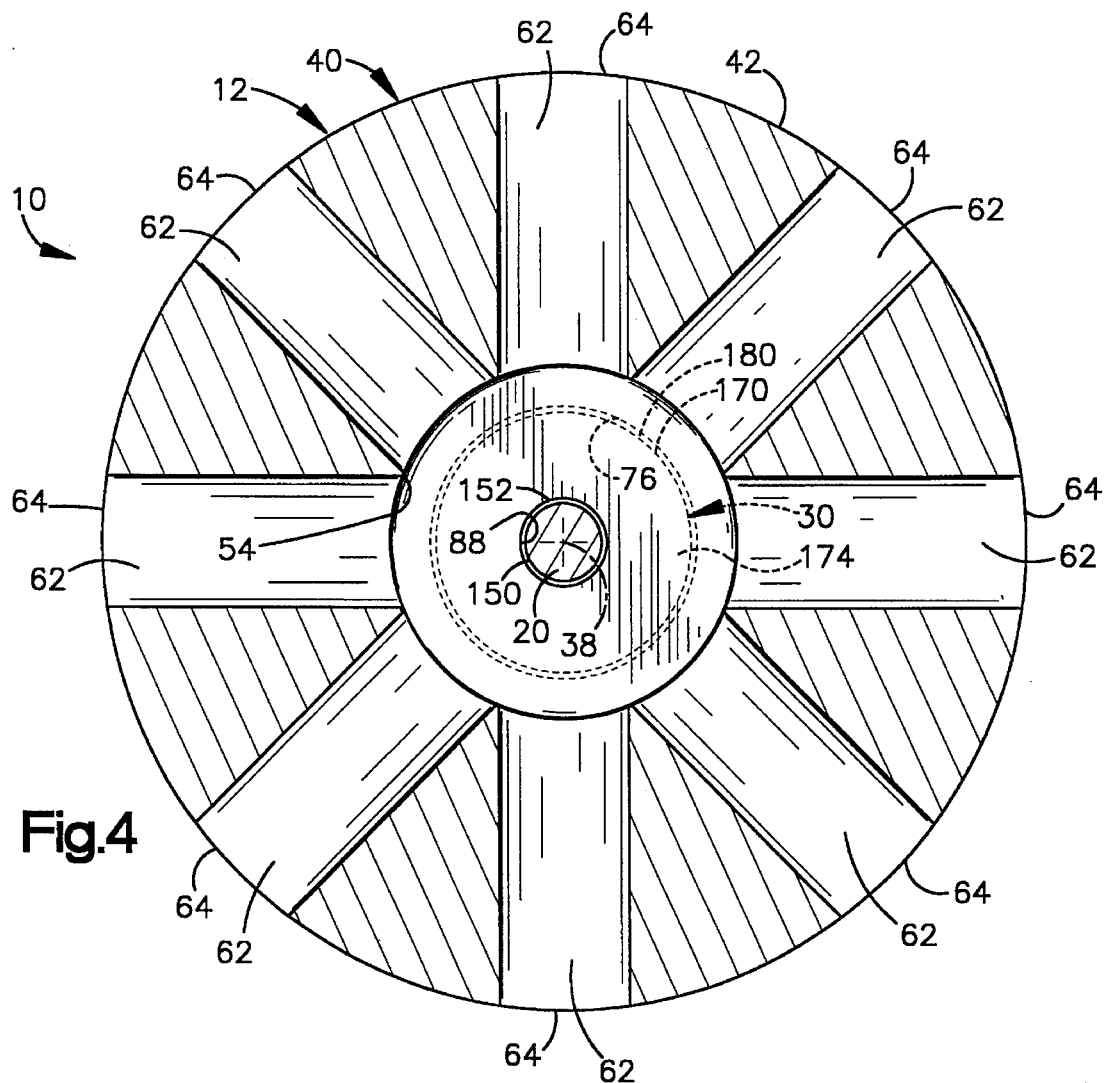
FIG. 4 is a sectional view taken along line 4—4 of FIG. 1 with parts removed.

The striker 20 (FIGS. 1–2) is a solid metal rod having a cylindrical outer peripheral surface 150 (FIG. 2). The striker 20 extends through the opening 90 between the cylinder 80 and the distribution chamber 60. The diameter of the striker 20 is slightly less than the diameter of the opening 90 so that the outer peripheral surface 150 of the striker is disposed adjacent to and is spaced apart from the end wall 82 of the manifold 12. A portion of the opening 90 thus forms an annular axially extending gap 152 between the outer peripheral surface 150 of the striker 20 and the cylindrical surface 88 on the manifold 12, as can be seen in FIGS. 2 and 4.

The inner end portion 154 (FIG. 2) of the striker 20 is disposed adjacent to and radially inward of the gas outlet passages 62 when the inflator is in the unactuated condition shown in FIG. 1. The inner end portion 154 of the striker 20 has a sharp circular cutting edge 155 (FIG. 2) which circumscribes a concave end face 156 of the striker.

The piston 30 is disposed in the cylinder 80 in the manifold 12. The piston 30 is a cylindrical metal member having a cylindrical outer peripheral surface 170 which extends axially between a circular outer end face 172 and an annular end surface 174. The piston 30 divides the cylinder 80 into a rod end portion 176 and a head end portion 178. The striker 20 extends from the annular end surface 174 of the piston 30 through the rod end portion 176 of the cylinder 80. The piston 30, together with the striker 20, is a solid member with no passages extending through either the piston or the striker.

The diameter of the piston 30 is slightly less than the diameter of the cylinder 80 so that the outer peripheral surface 170 of the piston is disposed adjacent to and spaced apart from the side wall 75 of the manifold 12. A portion of the cylinder 80 thus forms an annular gap 180 between the outer peripheral surface 170 of the piston 30 and the cylindrical surface 76 on the side wall 75 of the manifold 12. There is no seal between the piston 30 and the manifold 12, thus reducing the number of parts and the cost.

The spring 34 (FIGS. 1 and 2) is a compression spring which extends between the end surface 174 of the piston 30 and the annular surface 84 on the end wall 82 of the manifold 12. The spring 34 supports the piston 30 and striker 20 in position in the manifold 12. Because of the clearance around the piston 30 and the striker 20, the piston and striker may shift radially off the axis 38. If this occurs, there is still sufficient clearance to allow fluid flow past the piston 30 and the striker 20.

Figure 3:
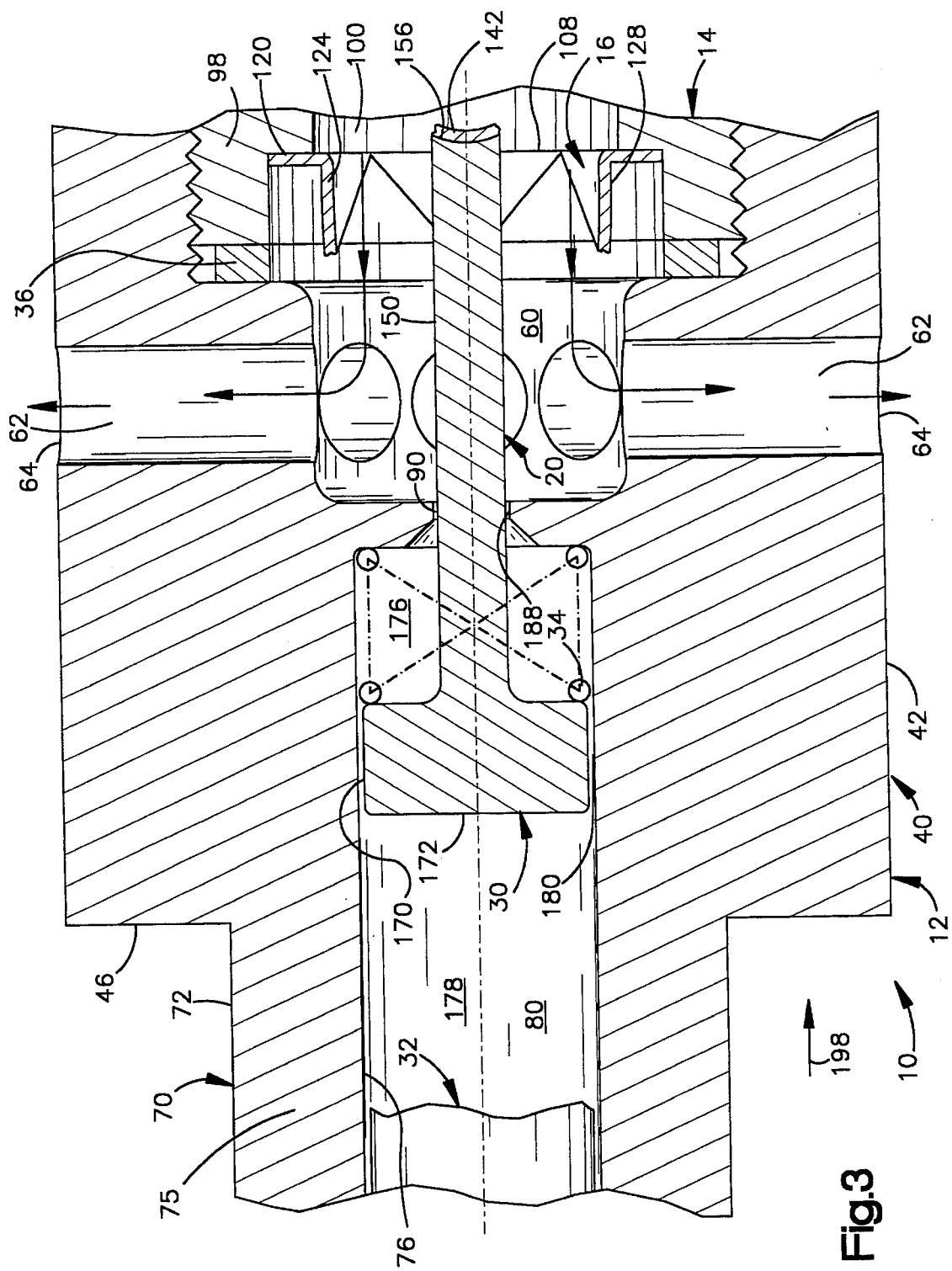
FIG. 3 is a view similar to FIG. 2 showing the inflator in a second stage of actuation.

The spring 34 biases the piston 30 and thus the striker 20 in a direction away from the burst disk 16, that is, to the left as viewed in FIGS. 1–3. The spring 34 is compressible under the influence of forces from the initiator 32 to enable the piston 30 and thus the striker 20 to move in a direction 198 toward the burst disk 16, that is, to the right as viewed in FIGS. 1–3. The spring 34 resists movement of the piston 30 and striker 20 until the initiator 32 is actuated. Thus, the spring 34 prevents the striker 20 from inadvertently engaging the burst disk 16 as a result of vibration or other forces applied to the inflator 10.

The initiator 32 (FIG. 1) is disposed in the head end portion 178 of the cylinder 80. The initiator 32 is a known electrically actuatable initiator which includes two electrically conductive pins 190. The pins 190 provide a path for electric current to actuate the initiator 32. The initiator 32 may include an ignitable pyrotechnic material such as zirconium potassium perchlorate to generate heat, pressure, and gases for moving the piston 30 in the cylinder 80.

In an event of a side impact to the vehicle in which the inflator 10 is mounted, a deceleration sensor of known construction and other vehicle electric circuitry, indicated schematically at 194, complete an electric circuit to permit electric current to flow to the pins 190 of the initiator 32. The electric current actuates the initiator 32. The initiator 32 emits a shock wave and combustion products including heat, pressure, and gases in the head end portion 178 of the cylinder 80.

The combustion products of the initiator 32 immediately flow through the annular gap 180 between the outer peripheral surface 170 of the piston 30 and the side wall 75 of the manifold 12. From the gap 180, the combustion products flow into the rod end portion 176 of the cylinder 80. The combustion products then flow through the gap 152 between the outer peripheral surface 150 of the striker 20 and the end wall 82 of the manifold 12. From the opening 180, the combustion products flow into the distribution chamber 60 and into the gas outlet passages 62. The combustion products of the initiator 32 flow into the distribution chamber 60 prior to and during the rupturing of the burst disk 16 and also during the emptying of the container 14.

The shock wave and the combustion products from the initiator 32 push against the outer end surface 172 of the piston 30 and overcome the biasing effect of the spring 34. The piston 30 moves along the axis 38 in the direction 198, toward the burst disk 16, compressing the spring 34. This movement of the piston 30, under the influence of the forces generated by the actuation of the initiator 32, causes the striker 20 to move axially into engagement with the burst disk 16 as seen in FIG. 2.

The end portion 154 of the striker 20 engages the burst disk 16 at or near the center 140 of the burst disk. The sharp edge 155 on the end portion 154 of the striker 20 cuts into the burst disk 16 to rupture the burst disk. The striker 20 removes the circular central portion 142 of the burst disk 16 as seen in FIG. 3. The removed portion 142 of the burst disk 16 includes the area of intersection of the score lines 132–138 in the burst disk, as well as a portion of each one of the score lines, ensuring that the burst disk ruptures along the score lines as intended. The portion 142 of the burst disk 16 which is removed is held against the concave end face 156 of the striker 20 by the pressure of the gas in the container 14, until the pressure drops when inflation of the air bag is completed.

When the striker 20 ruptures the burst disk 16, the fluid pressure in the chamber 100 in the container 14 deforms the segments 124–130 of the burst disk as seen in FIG. 3 as the stored gas escapes from the chamber. The gas in the container 14 flows out of the chamber 100 through the passage 108 and through the ruptured burst disk 16 into the distribution chamber 60.

In the distribution chamber 60, the gas from the container 14 mixes with the combustion products of the initiator 32. The combustion products of the initiator 32 heat and augment the gas from the container 14. The gas from the distribution chamber 60 flows around the end portion 154 of the striker 20 and into the gas outlet passages 62 in the manifold 12. From the gas outlet passages 62, the gas flows through the gas outlet openings 64 to the air bag (not shown) to inflate the air bag.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for inflating an inflatable vehicle occupant restraint to protect a vehicle occupant in the event of a side impact to the vehicle, said apparatus comprising:

a container for storing fluid under pressure;

a manifold connected with said container and including passage means for directing a flow of fluid from said container into the inflatable vehicle occupant restraint, said manifold having a side wall and an end wall defining a cylinder in said manifold;

a burst disk located to block fluid flow from said container through said passage means;

a piston disposed in said cylinder and dividing said cylinder into a first portion and a second portion, said piston having an outer peripheral portion disposed adjacent to and spaced apart from said side wall of said cylinder;

a striker connected for movement with said piston, said striker extending from said piston through said second portion of said cylinder in a direction toward said burst disk, said piston and said striker being movable axially from a first position in which said striker is spaced apart from said burst disk to a second position in which said striker is in engagement with said burst disk to cause rupturing of said burst disk; and an initiator for, upon actuation, moving said piston in said cylinder from the first position to the second position;

said end wall of said manifold defining an opening extending between said second portion of said cylinder and said passage means, said striker extending out of said second portion of said cylinder through said opening in said end wall and into said passage means, said striker having an outer peripheral portion which is disposed adjacent to and spaced apart from said end wall;

said initiator producing combustion products which flow, upon actuation of said initiator and when said piston is in the first position, from said first portion of said cylinder, between said outer peripheral portion of said piston and said side wall of said cylinder, into said second portion of said cylinder and thence through said opening in said end wall of said cylinder and into said passage means.

2. An apparatus as set forth in claim 1 wherein said piston is formed as one piece with said striker, said piston and striker being solid and free of passages.

3. An apparatus as set forth in claim 1 wherein said opening in said end wall of said manifold is circular and said striker has a circular cross-sectional configuration, a portion of said opening between said striker and said end wall forming an annular gap through which said combustion products flow from said second portion of said cylinder to said passage means.

4. An apparatus as set forth in claim 3 wherein each one of said piston and said cylinder has a cylindrical cross-sectional configuration, a portion of said cylinder between said piston and said side wall forming an annular gap through which said combustion products flow from said first portion of said cylinder to said second portion of said cylinder.

5. An apparatus as set forth in claim 1 wherein said passage means comprises a distribution chamber in said manifold, said burst disk blocking fluid flow between said container and said distribution chamber, said manifold including a plurality of gas outlet passages extending from said distribution chamber, said striker having an end portion which is disposed in said distribution chamber radially inward of said gas outlet passages when said striker is in the first position.

6. An apparatus as set forth in claim 1 wherein said burst disk has a central axis which is coincident with a longitudinal central axis of said apparatus, said piston being supported for movement in a direction along said central axis of said burst disk from the first position to the second position, said apparatus further comprising spring means for biasing said piston into the first position, said initiator being actuatable to move said piston against the biasing effect of said spring means from the first position to the second position to cause rupturing of said burst disk.

7. An apparatus as set forth in claim 1 wherein said burst disk has a plurality of score lines which intersect each other, said burst disk having an area which includes the intersection of said score lines and a portion of each one of said score lines, said striker having a portion for cutting said area out of said burst disk upon movement of said striker from the first position to the second position.

8. An apparatus for controlling flow of fluid, said apparatus comprising:

passage means for directing fluid flow;

a burst disk having a plurality of score lines which intersect each other, said burst disk having an area which includes the intersection of said score lines and a portion of each one of said score lines;

means for supporting said burst disk at a location to block fluid flow through said passage means;

a member engageable with said burst disk;

means for supporting said member for movement from a first position to a second position in engagement with said burst disk to cause rupturing of said burst disk along said score lines to enable fluid to flow through said passage means; and means for moving said member from the first position to the second position;

said member having a portion for cutting said area out of said burst disk during movement of said member from the first position to the second position.

9. An apparatus as set forth in claim 8 wherein said score lines intersect at and extend radially outward from said central axis of said burst disk, said area of said burst disk having a circular configuration centered on said axis.

10. An apparatus as set forth in claim 8 wherein said portion of said member for cutting said area out of said burst disk includes a circular cutting edge circumscribing a concave end face of said member and engageable with said burst disk to rupture said burst disk, the pressure of said gas in said container holding said area of said burst disk against said concave end face of said member during inflation of said inflatable vehicle occupant restraint.

11. An apparatus for inflating an inflatable vehicle occupant restraint, said apparatus comprising:

container means for storing fluid under pressure;

passage means for directing a flow of fluid from said container means into the inflatable vehicle occupant restraint;

a burst disk located to block fluid flow through said passage means, said burst disk having a central axis;

a member for causing said burst disk to rupture to release said fluid from said container means, said member being supported for movement in a direction along said central axis of said burst disk from a first position to a second position;

spring means for biasing said member into the first position;

means for moving said member against the biasing effect of said spring means from the first position to the second position to cause rupturing of said burst disk;

a manifold which is connected with said container and which includes said passage means, said manifold having a side wall and an end wall defining a cylinder in said manifold;

said member comprising a piston and a striker connected for movement with said piston;

said piston being disposed in said cylinder and dividing said cylinder into a first portion and a second portion, said piston having an outer peripheral portion disposed adjacent to and spaced apart from said side wall of said cylinder;

said striker extending axially from said piston through said second portion of said cylinder in a direction toward said burst disk, said piston and said striker being movable axially from a first position in which said striker is spaced apart from said burst disk to a second position in which said striker is in engagement with said burst disk to cause rupturing of said burst disk;

said means for moving comprising an initiator for, upon actuation, moving said piston in said cylinder from the first position to the second position;

said end wall of said manifold defining an opening extending between said second portion of said cylinder and said passage means, said striker extending out of said second portion of said cylinder through said opening in said end wall and into said passage means, said striker having an outer peripheral portion which is disposed adjacent to and spaced apart from said end wall;

said initiator producing combustion products which flow, upon actuation of said initiator and when said piston is in the first position, from said first portion of said cylinder, between said outer peripheral portion of said piston and said side wall of said cylinder, into said second portion of said cylinder and thence through said opening in said end wall of said cylinder and into said passage means.

12. An apparatus for controlling flow of fluid, said apparatus comprising:

passage means for directing fluid flow;

a burst disk having a plurality of score lines which intersect each other, said burst disk having an area which includes the intersection of said score lines and a portion of each one of said score lines;

means for supporting said burst disk at a location to block fluid flow through said passage means;

a member engageable with said burst disk;

means for supporting said member for movement from a first position to a second position in engagement with said burst disk to cause rupturing of said burst disk along said score lines to enable fluid to flow through said passage means;

means for moving said member from the first position to the second position;

said member having a portion for cutting said area out of said burst disk during movement of said member from the first position to the second position;

a container for storing fluid under pressure and a manifold connected with said container, said manifold including said passage means for directing a flow of fluid from said container into the inflatable vehicle occupant restraint, said manifold having a side wall and an end wall defining a cylinder in said manifold;

a piston disposed in said cylinder and dividing said cylinder into a first portion and a second portion, said piston having an outer peripheral portion disposed adjacent to and spaced apart from said side wall of said cylinder;

said member comprising a striker connected for movement with said piston, said striker extending axially from said piston through said second portion of said cylinder in a direction toward said burst disk, said piston and said striker being movable axially from a first position in which said striker is spaced apart from said burst disk to a second position in which said striker is in engagement with said burst disk to cause rupturing of said burst disk;

said means for moving comprising an initiator for, upon actuation, moving said piston in said cylinder from the first position to the second position;

said end wall of said manifold defining an opening extending between said second portion of said cylinder and said passage means, said striker extending out of said second portion of said cylinder through said opening in said end wall and into said passage means, said striker having an outer peripheral portion which is disposed adjacent to and spaced apart from said end wall;

said initiator producing combustion products which flow, upon actuation of said initiator and when said piston is in the first position, from said first portion of said cylinder, between said outer peripheral portion of said piston and said side wall of said cylinder, into said second portion of said cylinder and thence through said opening in said end wall of said cylinder and into said passage means.

13. An apparatus as set forth in claim 8 wherein said member is solid and is free of passages.

* * * * *